(12) United States Patent  (10) Patent No.: US 8,345,186 B2
Ajichi  (45) Date of Patent: Jan. 1, 2013

(54) ILLUMINATION DEVICE AND LIQUID CRYSTAL DISPLAY DEVICE (75) Inventor: Yuhsaku Ajichi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 459 days.

(21) Appl. No.: 12/669,830

(22) PCT Filed: Aug. 4, 2008

(86) PCT No.: PCT/JP2008/063978
§ 371 (c)(1),
(2), (4) Date: Jan. 20, 2010

(87) PCT Pub. No.: WO2009/044584
PCT Pub. Date: Apr. 9, 2009

(65) Prior Publication Data
US 2010/0188604 A1 Jul. 29, 2010

(30) Foreign Application Priority Data
Oct. 3, 2007 (JP) ................................. 2007-260377

(51) Int. Cl.
*G02F 1/1335* (2006.01)
(52) U.S. Cl. ............ 349/65; 349/64; 362/97.3; 362/613; 362/631
(58) Field of Classification Search .................... 349/64, 349/65; 362/613, 631, 97.3
See application file for complete search history.

(56) References Cited

U.S. PATENT DOCUMENTS
6,241,358 B1  6/2001 Higuchi et al.
6,580,477 B1  6/2003 Cho
2003/0206253 A1  11/2003 Cho
2005/0128374 A1  6/2005 Furukawa
2006/0245213 A1  11/2006 Beil et al.
2007/0247869 A1  10/2007 Lang et al.
2007/0290622 A1  12/2007 Furukawa
2008/0043171 A1* 2/2008 Takahashi et al. ............. 349/65

FOREIGN PATENT DOCUMENTS
CN  1751253 A  3/2006
JP  59-53703 U  4/1984
JP  11-288611 A  10/1999
(Continued)

OTHER PUBLICATIONS
Official Communication issued in corresponding European Patent Application No. 08792175.5, mailed on Mar. 23, 2011.
(Continued)

*Primary Examiner* — Michael Caley
(74) *Attorney, Agent, or Firm* — Keating & Bennett, LLP (57) ABSTRACT A backlight includes a spot-shaped light source and a light guide unit including a light guide arranged to diffuse and surface-emit light from the light source. The light guide unit includes a substrate to dispose and fixate the light source and the light guide. Protruding sections are provided on an incident surface of the light guide upon which light from the light source is incident, so as to protrude in a direction opposite to an incident direction of the light from the light source. Further, the light guide is fixedly disposed on the substrate by connecting the protruding sections to the substrate. As a result, with the illumination device including the light source and the light guide, it is possible to achieve an illumination device with a higher light use efficiency and higher luminance homogeneity.

4 Claims, 6 Drawing Sheets

FOREIGN PATENT DOCUMENTS

| | | |
|---|---|---|
| JP | 2001-75096 A | 3/2001 |
| JP | 2004-184493 A | 7/2004 |
| JP | 2004-265635 A | 9/2004 |
| JP | 2006-522436 A | 9/2006 |
| WO | 2005/114273 A1 | 12/2005 |

OTHER PUBLICATIONS

Official Communication issued in International Patent Application No. PCT/JP2008/063978, mailed on Sep. 16, 2008.

* cited by examiner

ILLUMINATION DEVICE AND LIQUID CRYSTAL DISPLAY DEVICE

BACKGROUND OF THE INVENTION

1. Field of the Invention

The present invention relates to an illumination device used, among others, as a backlight of a liquid crystal display device and to a liquid crystal display device provided with the illumination device.

2. Description of the Related Art

In recent years, liquid crystal display devices have gained in popularity at a rapid pace in place of cathode ray tubes or CRTs. Features of liquid crystal display devices include low energy consumption, thinness and light weight, and they are widely used in flat-screen televisions, monitors and portable phones, among others. To further enhance the features of liquid crystal display devices, it is an option to ameliorate an illumination device disposed at a backside of a liquid crystal display device.

Illumination devices are mostly divided into direct illumination devices and edge-light-type illumination devices. In direct illumination devices, a plurality of linear light sources (such as cold cathode tubes or hot cathode tubes) or a plurality of spot-shaped light sources such as light-emitting diodes are provided in a line at a backside of a liquid crystal panel. The light outputted from the light sources is directly irradiated onto the liquid crystal panel. With this configuration, a direct illumination device can more easily achieve a high luminance, even in the case of a large screen. Accordingly, direct illumination devices are mostly used as backlights of large-sized (twenty inches and over) liquid crystal displays.

Edge-light-type illumination devices include a light guide at the backside of the liquid crystal panel, as well as a light source on the side edge. The light outputted from the light source is reflected by the light guide and indirectly irradiated onto the liquid crystal panel. A positional relationship of the light source and of the light guide is determined by positioning carried out by utilizing a shape of the housing. In recent illumination devices designed for portable phones, especially, the positional relationship of the light source and of the light guide is also determined by positioning carried out by utilizing double-side tape in addition to the shape of the housing. With the edge-light-type illumination device having this configuration, the luminance is low; however, it is possible to achieve a thin shape, and homogeneity of the luminance is excellent. As a result, edge-light-type illumination devices are mostly used as backlights of medium-sized and small display devices such as portable phones or notebook computers.

Under such circumstances, in recent years, tandem-type illumination devices have been disclosed, in which a plurality of light guides are disposed so as to be aligned and stacked at the back of a liquid crystal display panel (as for example in Japanese Patent Application Publication, Tokukaihei, No. 11-288611 (Publication Date: Oct. 19, 1999) and Japanese Patent Application Publication, Tokukai, No. 2001-75096 (Publication Date: Mar. 23, 2001)). With this configuration, it is possible to obtain an illumination device having both the merits of direct-type illumination devices (i.e., high luminance and large size) and the merit of edge-light-type illumination devices (i.e., thinness).

In the case of an edge-light-type illumination device or of a tandem-type illumination device, a positional relationship of a light source and of a light guide wields a great influence over a brightness of the illumination device. For example, in the case that the light source and the light guide are disposed extremely close to each other, a light incidence efficiency of the light guide increases, thus making it possible to obtain an illumination device having a high light use efficiency. On the other hand, in the case that the light source and the light guide are disposed slightly apart from each other, the light incidence efficiency of the light guide decreases, thus resulting in a problematic decrease of the brightness of the illumination device. This problem becomes more severe as the distance between the light source and the light guide is further increased.

Further, when providing the light guide (whose function is to diffuse the light emitted from the light source) with a hole to allow the passage of a fixation member (such as a screw) in the direction of movement of the light, the light becomes diffused in a different direction than in other areas of the light guide. As a result, the luminance of the illumination device is no longer homogeneous.

In addition, in a tandem-type illumination device, a plurality of light guide units composed by assembling together a light source and alight guide are disposed in parallel and in stacks, in order to form a large-sized illumination device. Therefore, the following problems arise in the case that each of the light guide units disposed in parallel and in stacks is constructed by assembling together a light source and a light guide in different positional relationships. Namely, the brightness for each light guide unit is different, and the luminance homogeneity of the illumination device degrades considerably.

SUMMARY OF THE INVENTION

In view of the above-described problems, preferred embodiments of the present invention provide, as an illumination device using a light source and a light guide, an illumination device with a higher light use efficiency and higher luminance homogeneity by contriving a fixation method for the light guide.

An illumination device in accordance with a preferred embodiment of the present invention preferably includes a spot-shaped light source, a light guide arranged to diffuse surface-emitting light from the light source, and a substrate arranged to fixedly dispose the light source and the light guide thereon, wherein the substrate is connected with an area on the light guide where the light inputted from the light source is not diffused so as to fix the light guide on the substrate.

Because the light outputted from the spot-shaped light source (such as a light-emitting diode) is refracted and inputted into the light guide having a certain refraction index, in the case of a flat incident surface and in accordance with Snell's law, the light outputted from the spot-shaped light source (except light having an incident angle within a certain angle) ceases to exist. Accordingly, within the light guide, two areas can be distinguished: an area which becomes a path for the light from the light source, and a non-light-path area (that is, an area where the light inputted from the light source is not diffused).

With the illumination device in accordance with a preferred embodiment of the present invention, the non-light-path area is connected, fixated and disposed on the substrate. In other words, because an area which is not reached by the light emitted from the light source and which is not affected by a course of the light is connected with the substrate, the light is not obstructed even if a connection unit with the substrate is provided on the light guide. Further, by disposing and fixating the light guide on the substrate, it is possible to determine the positional relationship of the light source and of the light guide. This way, it is possible to fixate the light guide on the substrate without losing the luminance homogeneity of the illumination device.

Further, by disposing and fixating together on the substrate the light source and the light guide, the positional relationship of the light source and of the light guide can be easily determined. As a result, when fixating the light guide on the substrate, by fixating the light guide in the vicinity of the light source, it is possible to obtain an illumination device having a high light use efficiency.

The area on the light guide where the light inputted from the light source is not diffused is an area where the light from the light source inputted in the light source body at a critical angle of $\theta$ does not reach. That is to say, this area is the area not included in a luminous flux outputted from the light source and diffused in a radial pattern within the light guide.

In the illumination device in accordance with a preferred embodiment of the present invention, protruding sections are preferably included on an incident surface of the light guide, the incident surface being a surface into which the light from the light source enters, and the protruding sections protruding in a direction opposite to an incident direction of the light from the light source, the light guide being fixatedly disposed on the substrate by connecting the protruding sections to the substrate.

With the above configuration, the protruding sections to fixate the light guide on the substrate are preferably provided on the incident surface of the light from the light source of the light guide so as to protrude in the direction opposite to the incident direction of the light from the light source. In other words, because the protruding sections are provided in the non-light-path area (that is, the area where the light inputted from the light source is not diffused), the light is not obstructed by the protruding sections. Further, by disposing and fixating the protruding sections on the substrate, it is possible to determine the positional relationship of the light source and of the light guide. This way, it is possible to fixate the light guide on the substrate without losing the luminance homogeneity of the illumination device.

Further, by disposing and fixating together on the substrate the light source and the protruding sections of the light guide, it is possible to determine easily the positional relationship of the light guide and of the light source. As a result, when fixating the light guide on the substrate, by fixating the light guide in the vicinity of the light source, it is possible to obtain an illumination device having a high light use efficiency.

In the illumination device in accordance with a preferred embodiment of the present invention, a plurality of combinations of the light source and of the light guide is preferably included, each light guide including a light-emitting section having a light-emitting surface, and a light-guiding section guiding the light from the light source toward the light-emitting section, the light-emitting section of each light guide being disposed so as to be on top of the light-guiding section of a light guide adjoining to this light guide.

An illumination device wherein a combination of the light source and of the light guide (such a combination being called light guide unit) is disposed as described above is called a tandem-type illumination device. By using such a tandem-type illumination device as a backlight, it is possible to achieve a large-sized and thin liquid crystal display device.

Further, with the above configuration, the protruding sections are provided on an edge of the light guide on a side of the light-guiding section. Accordingly, because the protruding sections are disposed so as to be concealed by a lower side of the light-emitting section of the light guide disposed adjoiningly in a direction opposite to the direction of movement of the light from the light source, it is possible to fixate the light guide on the substrate without losing the luminance homogeneity of the illumination device.

Further, it is possible to unify the positional relationship of the light source and of the light guide for each of the plurality of light guide units disposed alongside each other. As a result, when an amount of light outputted from each of the light sources is equal, it is possible to lower the differences in luminance between each light guide unit, and it is possible to obtain an illumination device having homogeneous outputted light.

In the illumination device in accordance with a preferred embodiment of the present invention, the protruding sections are preferably provided respectively on both sides of the light source.

With the above configuration, because the protruding sections are provided on both sides of the light source, it is possible to securely fixate the light guide on the substrate.

In the illumination device in accordance with a preferred embodiment of the present invention, the protruding sections preferably include a hole, the light guide being fixedly disposed on the substrate by a fixing member passing through the hole and fixated on the substrate.

With the above configuration, because it is possible to adjust more accurately the position of the light guide with regard to the substrate, it is possible to determine the positional relationship of the light guide and of the light source more clearly. As a result, when fixating the light guide by using the fixing member, by fixating the light guide near the light source, it is possible to obtain an illumination device having a high light use efficiency.

Further, with the tandem-type illumination device, it is possible to adjust more accurately the positional relationship of the light source and of the light guide for each of the plurality of the light guide units disposed alongside each other. As a result, when an amount of light outputted from each of the light sources is equal, it is possible to further lower the differences in luminance between each light guide unit, and it is possible to obtain an illumination device having a more homogeneous outputted light.

The fixing member may for example be a screw.

In the illumination device in accordance with a preferred embodiment of the present invention, the light-emitting surface of the light guide is preferably parallel to that surface of the light guide which is in contact with the substrate.

With the above configuration, it is possible to make the light-emitting surface and the substrate parallel, to each other, and it is possible to put the light guide and the substrate in contact with each other. This way, it is possible to fixate with a high degree of precision the light guide and the light source.

In the above illumination device, the light guide preferably includes a light-emitting section having a light-emitting surface, and a light-guiding section guiding the light from the light source toward the light-emitting surface, the light-guiding section being arranged so as to be oblique with regard to the light-emitting surface.

With the above configuration, it is possible to increase the output efficiency of the light from the light-emitting surface. Further, with the above configuration, providing the plurality of light guides in a tandem disposition does not result in an increase in thickness, thus making it possible to achieve a thin tandem-type illumination device.

Further, in order to solve the above problems, a liquid crystal display device in accordance with yet another preferred embodiment of the present invention includes a backlight that is any of the above illumination devices.

With the above configuration, because an illumination device with a high luminance homogeneity is used as the backlight, it is possible to irradiate on the liquid crystal display panel a more homogeneous light, and thus to increase display quality. Further, because an illumination device with a high luminance homogeneity is used as backlight, it is possible to achieve a liquid crystal display device with reduced electricity consumption.

A fuller understanding of the other features, elements, steps, characteristics, and merits of the present invention can be obtained from the ensuing description. Further, the advantages of the present invention will become obvious by referring to the following description of preferred embodiments of taken in conjunction with the accompanying drawings.

DETAILED DESCRIPTION OF THE PREFERRED EMBODIMENTS

Preferred embodiments of the present invention are described below with reference to the attached drawings FIGS. 1 to 7C. The present invention, however, isnot limited to the preferred embodiments described herein.

The following description concerns an illumination device used as backlight in a liquid crystal display device in accordance with the present preferred embodiment.

Figure 2:
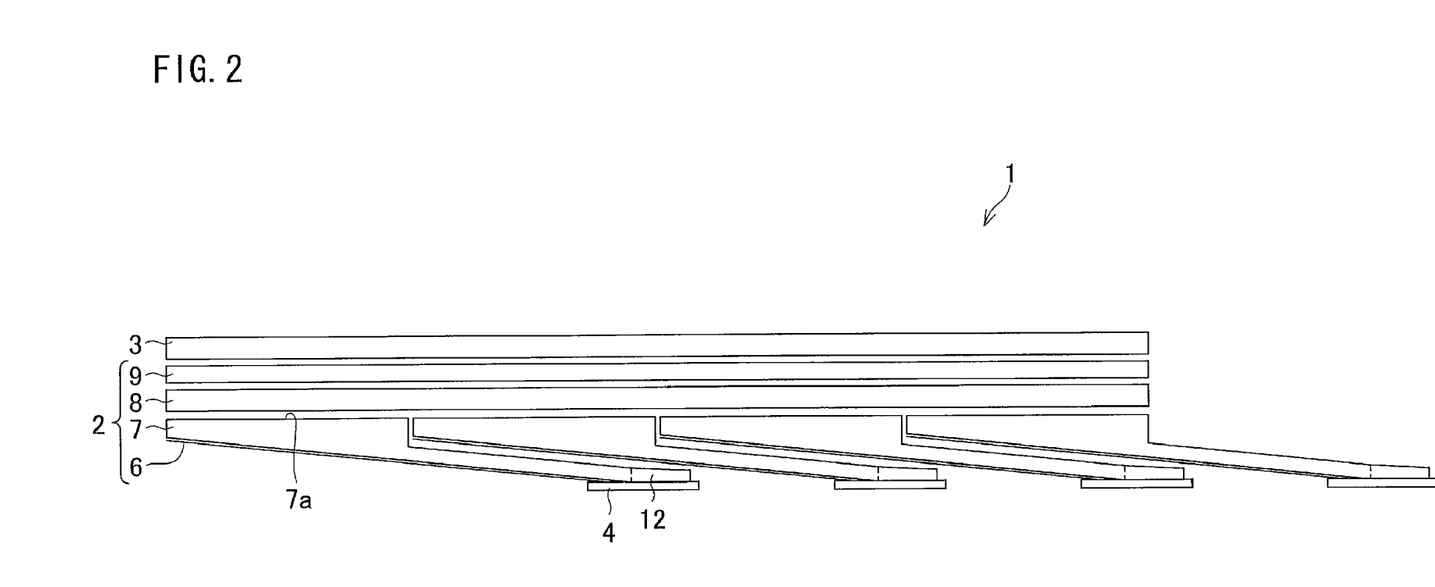
FIG. 2 is a lateral view illustrating a configuration of a liquid crystal display device in accordance with a preferred embodiment of the present invention.

FIG. 2 is a lateral view illustrating the outline of a configuration of a liquid crystal display device 1 in accordance with the present preferred embodiment. The liquid crystal display device 1 includes a backlight 2 (illumination device) and a liquid crystal display panel 3 disposed in opposition to the backlight 2.

The liquid crystal display panel 3 is similar to a standard liquid crystal display panel used in a conventional liquid crystal display device. The liquid crystal display panel 3 (not shown) for example includes an active matrix substrate including a plurality of TFTs (thin film transistors) and a color filter (CF) substrate disposed in opposition to the active matrix substrate. Between the two above-described substrates, the liquid crystal display panel 3 includes a liquid crystal layer sealed with a sealing material.

Next, the following description concerns the configuration of the backlight 2 provided on the liquid crystal display device 1.

As shown in FIG. 2, the backlight 2 is disposed on a backside (a side opposite to a display surface) of the liquid crystal display panel 3.

Figure 3:
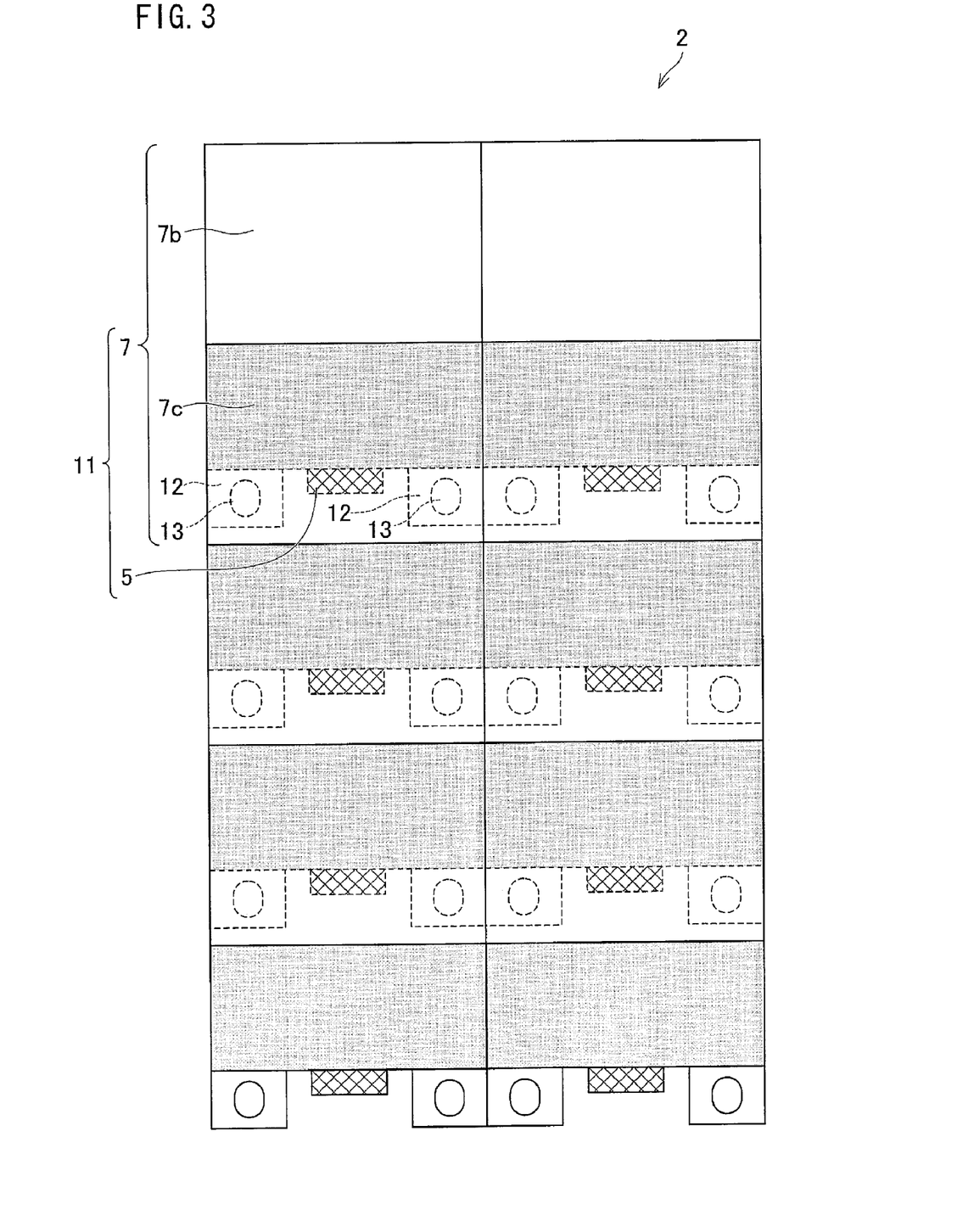
FIG. 3 is a plan view illustrating a configuration of a backlight provided on the liquid crystal display device shown in FIG. 2.

FIG. 3 shows a plan view of the configuration of the backlight 2 provided on the liquid crystal display device 1. As shown in FIG. 3, the backlight 2 includes a plurality of light guide units 11 including a combination of a light source 5 and of a light guide 7.

The following describes the configuration of the light guide unit 11 with reference to FIGS. 2 and 3. In one light guide unit 11, a light source 5, a light guide 7 diffusing and surface-emitting the light from the light source 5, a substrate 4 whereon the light source 5 is disposed, a reflection sheet 6 and so on are provided.

The light source 5 preferably is a spot-shaped light source such as a light-emitting diode (LED), for example. In the present preferred embodiment, the light source 5 preferably includes a plurality of LEDs of various color types. Specifically, the light source 5 preferably includes an LED group wherein a plurality of LEDs for emitting the three colors red (R), green (G) and blue (B) respectively are disposed alongside each other. Providing a light source by assembling light-emitting diodes of three colors as above makes it possible to irradiate a white light from the light-emitting surface.

The combination of the colors of the light-emitting diodes can be determined as appropriate in consideration of a color emitting property of each LED and of a color emitting property that the backlight desirably has in line with usage of the liquid crystal display device 1. The light source 5, which includes a LED group, is mounted on the substrate 4. LED chips of each color molded on one package as side light-emitting type LEDs may be used as light source 5. This way, it becomes possible to obtain a backlight having a wide color reproduction range.

The light guide 7 is arranged to receive the light outputted from the light source 5 and to surface-emit light from a light-emitting surface (also called light-outputting surface) 7a. The light-emitting surface 7a is a surface irradiating the light toward a target of the irradiation. In the present preferred embodiment, the backlight 2 preferably has a tandem-type configuration, as shown in FIGS. 2 and 3. In other words, the plurality of light guides 7 included in the backlight 2 include a light-emitting section 7b including the light-emitting surface 7a and a light-guiding section 7c guiding toward the light-emitting section 7b the light from the light source 5. The light-guiding section 7c of each light guide 7 is arranged so that the light-emitting section 7b of another light guide 7 is on top of the light-guiding section 7c. Such a arrangement is called tandem disposition.

Figure 1:
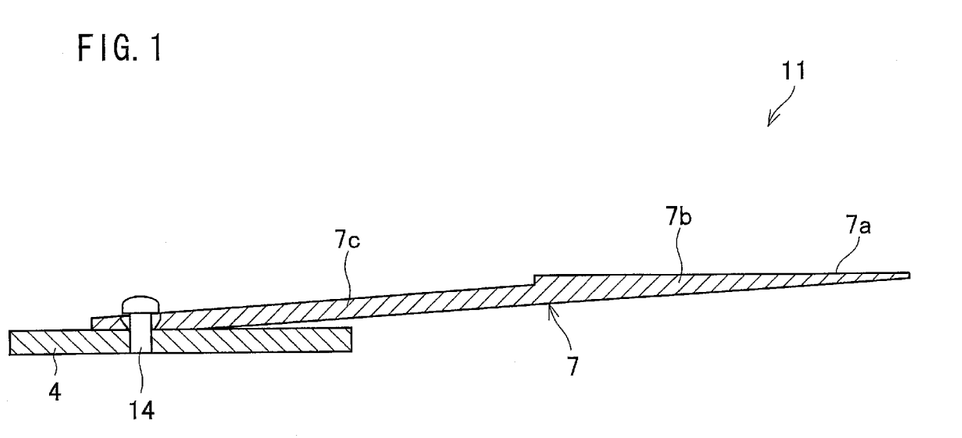
FIG. 1 is a cross-sectional view illustrating a configuration of a light guide unit included in a backlight provided in a liquid crystal display device shown in FIG. 2.

FIG. 1 is a cross-section view illustrating the configuration of the light guide unit 11 included in the backlight 2 shown in FIG. 2. As shown in FIG. 1, the light outputted from the light source 5 is inputted in the light-guiding section 7c of the light guide 7, propagates inside the light guiding section 7c and reaches the light-emitting section 7b. A process or treatment enabling the output of the guided light toward the frontal surface is applied on the front surface (light-guiding surface 7a) or on the back surface of the light-guiding section 7b of the light guide 7, even though the process or treatment is not illustrated here. The light is outputted from the light-guiding surface 7a of the light guide 7 toward the liquid crystal display panel 3. Concrete examples of the process or treatment applied to the light-guiding section 7b of the light guide 7 include prism processing, Shibo processing (a distribution of concavity and convexity), and printing, for example. However, the present invention is not limited to these methods, and any convenient conventional method may be used to treat or process the light-emitting surface 7a or the back surface.

Further, the light guide 7 is generally made from a transparent resin such as PMMA or polycarbonate, for example. However, there are no specific limitations in this regard. It is preferable that the light guide 7 be made from a material with a high light transparency.

Further, the light guide 7 can for example be formed through injection molding, extrusion molding, heat press molding, or cutting. However, the forming method is not limited to the above, and any processing method making it possible to obtain similar characteristics may be used.

The reflection sheet 6 is provided in contact with a rear side of each light guide 7 (i.e., an opposite side of the light-emitting surface 7a). The reflection sheet 6 reflects the light so as to cause the light-emitting surface 7a to emit a greater amount of light than the light-emitting surface 7a otherwise would emit without the reflection sheet 6.

The substrate 4 on which the light source 5 is mounted has a backside (i.e., the surface opposite to the surface on which the light source 5 is mounted) on which a driver (not shown) to control the lighting of each LED included in the light source 5 is mounted. In other words, the driver and the light source 5 are mounted on the same substrate 4. Providing the driver and the light source 5 on the same substrate makes it possible to reduce the number of substrates. Further, this allows a reduction of the number of connectors and the like connecting the substrates together. As a result, this makes it possible to lower the cost of the device. Further, the reduction in the number of substrates makes it possible to achieve a thinner backlight 2.

Further, as shown in FIG. 1, on the light guide unit 11 in accordance with the present preferred embodiment, protruding sections 12 are provided respectively on both sides with respect to the light source 5, in order to fixate and dispose the light guide 7 on the substrate 4. The protruding sections 12 are provided on an incident surface of the light guide 7 on which incident surface the light coming from the light source 5 enters. The protruding sections 12 are arranged so as to protrude in a direction opposite to an incident direction of the light from the light source. A screw hole (hole) 13 is formed on the protruding sections 12. The light guide 7 is fixated on the same substrate 4 as the light source 5 by screwing a screw (fixating member) 14 through the screw hole 13 into the substrate 4.

A diffusion plate 8 and an optical sheet 9 are provided on an upper section of a structure including a plurality of light-guiding units 11 in a tandem disposition in this way, as shown in FIG. 2. The diffusion plate 8 is disposed so as to cover the whole light-emitting surface 7a of each light guide 7. The diffusion plate 8 is disposed at a determined distance from the light-emitting surface 7a, and so as to face the light-emitting surface 7a. The diffusion plate 8 diffuses the light outputted from the light-emitting surface 7a of the light guide 7, and irradiates the diffused light to the optical sheet 9.

The optical sheet 9 includes any one of the followings: (i) a diffusion sheet focusing and dispersing the light, (ii) a lens sheet focusing the light so as to increase the luminance in the front direction, and (iii) a polarizer reflection sheet which, by reflecting a portion of polarization components and transmitting another portion of the polarization components, increases the luminance of the liquid crystal display device 1. Alternatively, the optical sheet 9 includes an appropriate combination of the above-mentioned sheets. The configuration of the optical sheet 9 may, for example, be determined depending on a cost and a function of the liquid crystal display device 1.

With the above configuration, the light outputted from the spot-shaped light-source 5 travels toward the light guide 7 while being simultaneously dispersed and reflected, and is outputted from the light-emitting surface 7a.

Then, by the diffusion plate 8 disposed on the front surface of the light guide 7 and the optical sheet 9 disposed on the front surface of the light guide 7, the light outputted from the light-emitting surface 7a is focused while being homogenized by being dispersed, before being irradiated to the liquid crystal display panel 3.

As described above, the backlight 2 in accordance with the present preferred embodiment has a configuration in which a plurality of light guide units including the combination of the light source and the light guide is disposed in a tandem disposition.

FIG. 3 is a plan view illustrating an example of a disposition of the light guide units 11. The backlight 2 shown in FIG. 3 preferably includes eight light guide units 11, for example. In this backlight 2, four light guide units 11 . . . are disposed in turn in such a manner that the light-emitting section 7b of the light guide 7 shown at the bottom of FIG. 3 is on top of the light-guiding section 7c of another light guide 7 disposed adjoiningly to the light-emitting section 7b. Further, combinations of similar light guide units 11 . . . are also disposed so as to be lined up next to one another. On FIG. 3, the light-guiding section 7c of each light guide 7 is highlighted using half-tone dot meshing.

As above, the backlight 2 in accordance with the present preferred embodiment includes a plurality of light guide units 11 combining the light source 5 and the light guide 7. Further, each light guide 7 includes (i) the light-emitting section 7b having the light-emitting surface 7a, and (ii) the light-guiding section 7c guiding the light from the light source 5 toward the light-emitting section. The light-emitting section 7b of each light guide 7 is disposed so as to be on top of the light-guiding section 7c of an adjoining light guide 7.

Next, explained is how to carry out positioning of the light source 5 and the light guide 7 in each light guide unit 11.

Figure 4A:
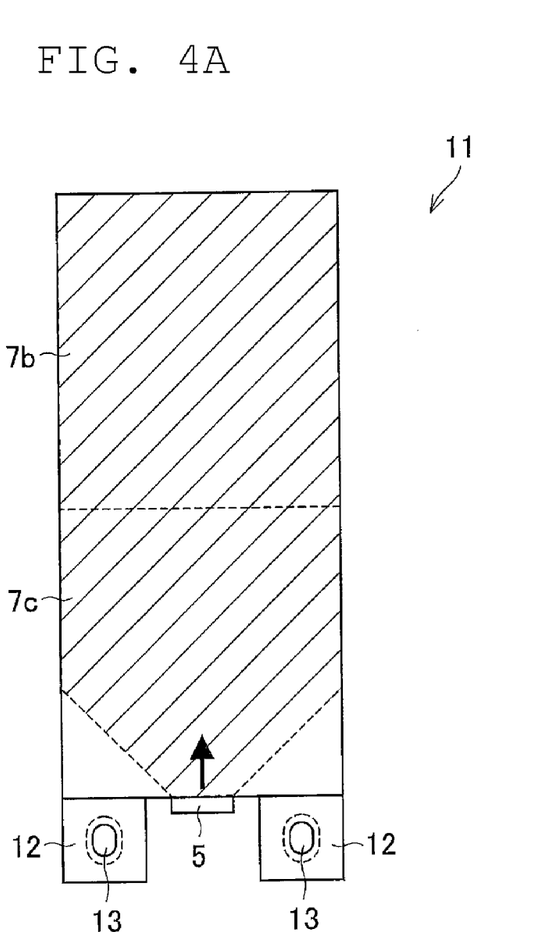
FIG. 4A is a plan view illustrating the configuration of a light guide included in the backlight provided on the liquid crystal display device shown in FIG. 2.
Figure 4B:
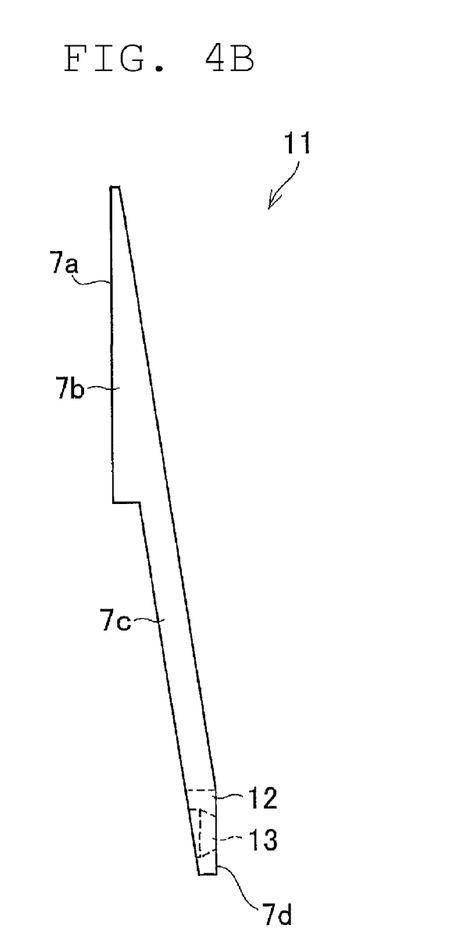
FIG. 4B is a lateral view illustrating the configuration of the light guide included in the backlight provided on the liquid crystal display device shown in FIG. 2.

FIG. 4A is a plan figure of the combination of the light guide 7 (included in the backlight 2) and of the light source 5. FIG. 4B is a lateral view of the light guide 7. In the light guide 7 in accordance with the present preferred embodiment, as shown in FIGS. 4A and 4B, protruding sections 12 are provided respectively on both sides with respect to the light source 5 in order to fixate and dispose the light guide 7 on the substrate 4. The protruding sections 12 are provided on the incident surface of the light from the light source 5 disposed on the light guide 7. The protruding sections 12 are arranged so as to protrude in the direction opposite to the incident direction of the light from the light source.

The screw hole (hole) 13, which preferably has an elliptical shape, is formed on the protruding sections 12. The light guide 7 is fixated on the substrate 4 by screwing a fixing member such as a screw through the screw hole 13 into the substrate 4.

This way, by forming the screw hole 13 on the protruding sections 12 and screwing the screw 14 through the screw hole 13, it is possible to position more accurately the light guide 7 with regard to the substrate 4. As a result, it is possible to have a more precise positional relationship between the light guide 7 and the light source 5, which are both provided on the same substrate 4. In addition, by fixating near the light source 5 an edge surface of the light guide 7, it is possible to obtain a backlight 2 having a high light use efficiency.

In the case that the screw hole (hole) has the same size as the screw thread, there is a possibility that the light guide and the light source will not be fixated without closely attaching each other, in the case that a screw hole of the substrate and a screw hole of the light guide are not positioned precisely enough with regard to each other. Therefore, it is preferable that the screw hole be bigger than the screw thread. This way, the screw hole has play, thereby ensuring that the light guide and the light source will be fixated together to be attached closely with each other.

In the present preferred embodiment, the screw hole preferably has an elliptical shape, for example, as shown in FIG. 4A. Because a section of a standard screw has a round shape (perfectly circular shape), providing the screw hole with an elliptical shape makes it possible to have play. With this configuration, because it is possible to dispose closer (i.e., closer to each other) the light guide 7 and the LED 5, the incidence efficiency of the light from the LED 5 to the light guide 7 is further increased, and it is possible to obtain an illumination device having a higher light use efficiency.

In the present preferred embodiment, by using a screw as fixating material and by passing the screw in the screw hole (hole) 13 formed on the protruding sections 12, the light guide 7 is fixated on the substrate 4. However, the present invention is not necessarily limited to such a configuration.

Apart from using a screw, other possible fixating methods encompass, for example, a method in which a protrusion, such as a pin, is formed on the protruding sections of the light guide, and the pin is fitted into the hole formed on the substrate.

Figure 5:
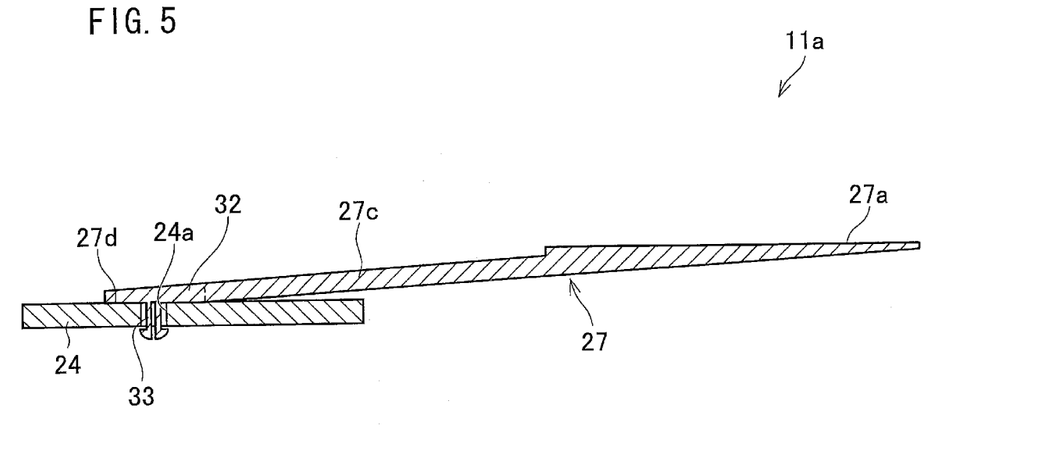
FIG. 5 is a cross-sectional view illustrating another example of the light guide unit provided on the illumination device in accordance with a preferred embodiment of the present invention.

FIG. 5 illustrates an example of a light guide unit in which the light guide is fixated to the substrate by a pin formed on a backside (the surface in contact with the substrate) of the light guide. The light guide unit 11a shown in FIG. 5 includes a light guide 27, an LED (not shown) and a substrate 24. On the light guide 27, a pin 33 is provided on a backside 27d (the surface in contact with the substrate 24) of a protruding section 32. The rest of the configuration is similar to the configuration of the light guide 7 shown in FIG. 4 and the like.

A hole 24a arranged to pass the pin 33 is formed in the substrate 24. By fitting the pin 33, which has a shape as shown in FIG. 5, into the hole 24a, it is possible to fixate and dispose the light guide 27 on the substrate 24.

Further, in the present preferred embodiment, a plurality of light guide units is disposed in a tandem arrangement, as shown in FIG. 3. By disposing the light guides this way, the protruding sections 12 of the first light guide 7 are concealed under the other light guide 7, because a light-emitting section 7b of another light guide 7 disposed alongside the light-guiding section 7c is arranged so as to be on top of the protruding sections 12. In this way, the protruding sections 12 will not be exposed to a light-outputting surface of the backlight 2. Accordingly, the above configuration makes it possible to fixate the light guide 7 without losing the luminance homogeneity of the backlight 2.

Further, by fixating the light guide 7 to the substrate 4 with accurate positioning relative to each other as described above, the positional relationship of the light source 5 and the light guide 7 in each of the plurality of light guide units 11 disposed alongside each other will be more accurately made uniform. As a result, in the case that an amount of light outputted from each of the light sources is equal, it is possible to reduce the luminance difference between each light guide unit and to obtain a backlight having a homogeneous light output.

The light outputted from the spot-shaped light source (such as a light-emitting diode) enters, with some refraction, into the light guide having a certain refraction index. Therefore, in the case of a flat incident surface, the light outputted from the spot-shaped light source (except light having an incident angle within a certain angle) ceases to exist in accordance with Snell's law. Accordingly, within the light guide 7, two areas can be distinguished: an area which becomes a light path for the light from the light source 5, and a non-light-path area (an area which is not a path of the light from the light source 5). FIG. 4A is a plan view in which the area which becomes a light path for the light from the light source is indicated using oblique lines.

In the backlight 2 in accordance with the present preferred embodiment, the protruding sections 12 to fixate the light guide 7 on the substrate 4 are provided. The protruding sections 12 are provided on the incident edge surface of the light from the light source 5 disposed on the light guide 7. The protruding sections 12 protrude in a direction opposite to an incident direction of the light from the light source 5 (i.e., the direction indicated with an arrow in FIG. 4A). In other words, because the projecting sections 12 are provided in the area which is not a path of the light from the light source 5 (i.e., the area in which the light inputted from the light source 5 is not diffused), the light is not obstructed by the protruding sections 12. Further, by fixedly disposing the protruding sections 12 on the substrate 4, it is possible to determine the positional relationship between the light source 5 and the light guide 7. In this way, it is possible to fixate the light guide 7 on the substrate 4 without losing the luminance homogeneity of the backlight 2.

Further, by fixedly disposing the light source 5 and the protruding sections 12 of the light guide 7 on the substrate 4, it is possible to easily determine the positional relationship of the light source 5 and of the light guide 7. As a result, when fixating the light guide 7 to the substrate 4, it is possible to fixate the light guide 7 in the vicinity of the light source 5. This makes it possible to obtain an illumination device having a high light use efficiency.

Further, as shown in FIG. 4A, in the light guide unit 11 in accordance with the present preferred embodiment, it is preferable that the light-emitting surface 7a of the light guide 7 be parallel to the contact surface 7d of the light guide 7. The contact surface 7d is in contact with the substrate 4. Further, as shown in FIG. 5, in the light guide unit 11 in accordance with the present preferred embodiment, it is preferable that the light-emitting surface 27a of the light guide 27 be parallel to the contact surface 27d of the light guide 27. The contact surface 27d is in contact with the substrate 24. In this case, the wording "parallel" does not include the tolerance scope.

With the above configuration, because the light-emitting surface and the substrate are parallel to each other, it is possible to put the light guide and the substrate in contact with each other. This makes it possible to fixate with a high degree of precision the light guide and the light source.

In addition, as shown in FIGS. 4A and 5, the light-guiding section 7c (or the light-guiding section 27c) of the light guide 7 (or the light guide 27) is preferably arranged so as to be oblique with regard to the light-emitting surface 7a (or light-emitting surface 27a).

With the above configuration, it is possible to increase the output efficiency of the light from the light-emitting surface. Further, with the above configuration, it is possible to achieve a thin tandem-type backlight without any increase in thickness, even in the case that a plurality of light guides is provided in a tandem disposition.

The present preferred embodiment has been described above by taking the example of a configuration in which the protruding sections provided on the light incident surface of the light guide are connected on the substrate. However, it must be noted that the present invention is not limited to this configuration. Regarding the present invention, any configuration in which the area in which the light inputted from the light source included in the light guide is not diffused and the substrate are connected to each other is acceptable.

FIGS. 6 and 7A-7C show another example of the configuration of the light guide unit provided on the illumination device in accordance with a preferred embodiment of the present invention. Here, the substrate is omitted from FIG. 6 and in FIG. 7A.

In the light guide unit 11b shown in FIGS. 6 and 7A-7C, protruding sections are not provided. An elliptical screw hole (hole) 53 is formed in an area A included in a light-guiding section 47c. A light guide 47 is fixated to the substrate 4 by inserting, through the screw hole 53, a fixing member such as a screw 54 into the substrate.

Figure 6:
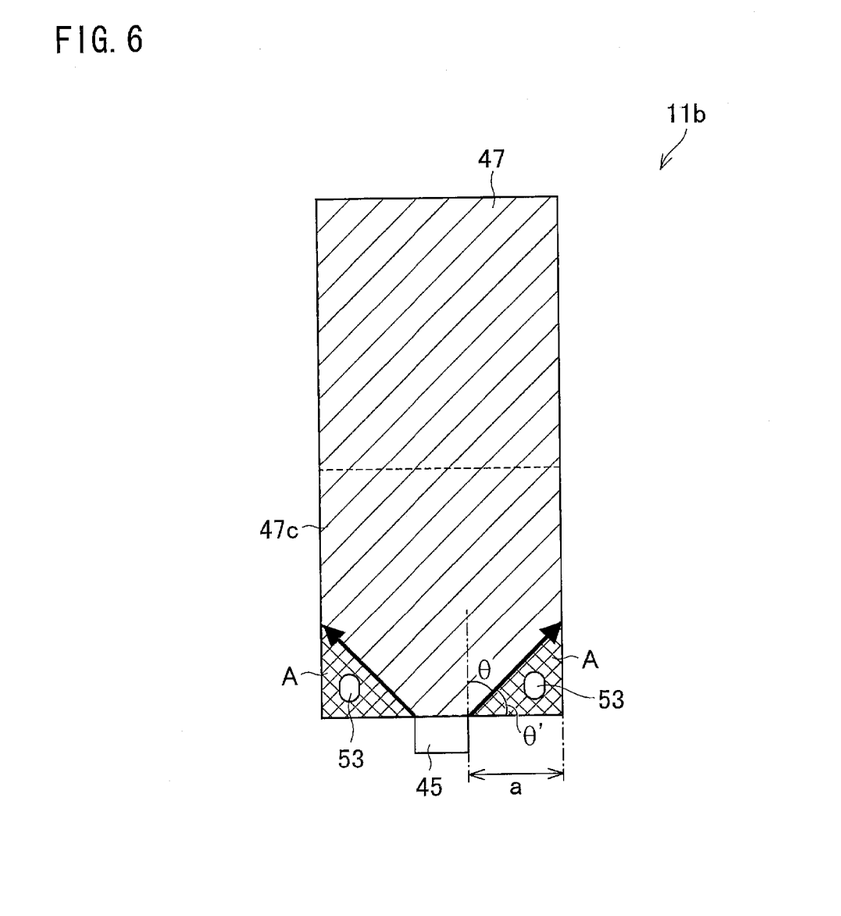
FIG. 6 is a plan view illustrating yet another example of the light guide unit provided on the illumination device in accordance with a preferred embodiment of the present invention.

The area A is an area in which the light from a light source 45, inputted in the light guide at a critical angle of θ, does not reach. In this case, "critical angle of θ" refers to the widest refraction angle (an inclination angle from a normal line of a boundary surface between an air layer and the light guide) with which the light irradiated from the air layer (whose refraction coefficient is comparatively lower) toward the light guide (whose refraction coefficient is comparatively higher) can be inputted.

For example, regarding the boundary surface between the light guide and the air layer, because a refraction coefficient n2 of a material included in the light guide is higher than a refraction coefficient n1 of the air layer (that is to say, n1<n2), the light inputted from the air layer into the light guide is refracted toward the normal line from the inclination angle (input angle) of the inputted light with respect to the normal line. Further, the refraction angle attained when the light enters at the widest input angle of 90° corresponds to the critical angle of θ.

In other words, in the present preferred embodiment, a light flux outputted from the light source 45 provided in the air layer spreads radially inside the light guide 47 at the critical angle of θ. The critical angle of θ formed in the light guide at the interface between the air layer and the light guide follows Snell's law, based on a refraction coefficient determined by a material from which the light guide 47 is made. Accordingly, aside from the light source 45, the light inputted from the light source is not diffused in the area A between an angle (90°−θ) and the interface. The dimensions of the area A are defined by (i) an angle θ' determined by 90°−θ and (ii) by a distance a corresponding to the distance between the edge of the light source 45 and an edge of a width direction of the light guide 47.

As above, the area A is defined as an area in which the light inputted from the light source 45 is not diffused. In other words, the area A is not included in the luminous flux outputted from the light source and spreading radially within the light guide. Because of this, providing in the area A a connecting apparatus to connect the area A to the substrate does not interfere with the progression of the light. As a result, it is possible to fixate the light guide on the substrate without losing the luminance homogeneity of the backlight.

In the plan view shown in FIG. 6, the area which becomes a path of the light from the light source 45 is indicated using oblique lines, while the area which does not become a path of the light (i.e., the area A) is indicated using a grid.

Figure 7A:
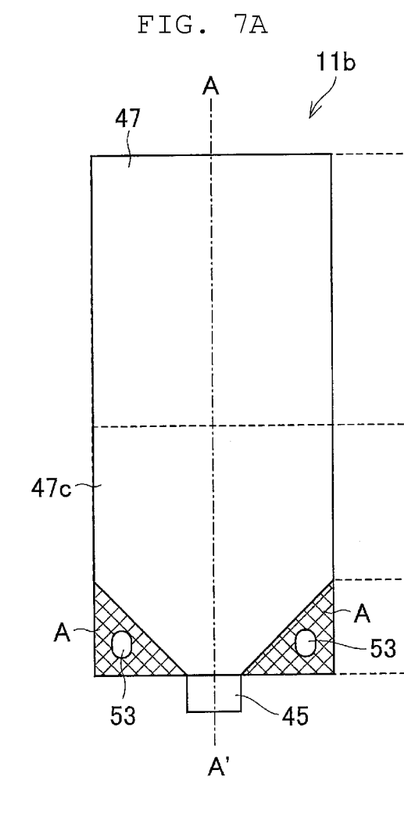
FIG. 7A is a plan view of the light guide unit shown in FIG. 6.
Figure 7B:
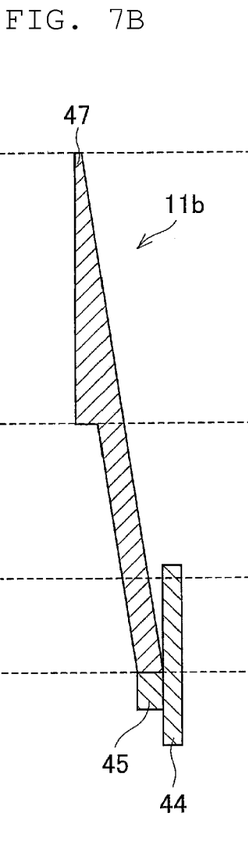
FIG. 7B is a cross-sectional view along the line A-A' of the light guide unit shown in FIG. 7A.
Figure 7C:
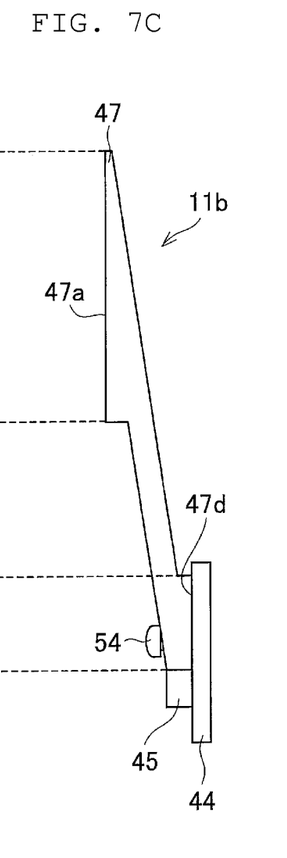
FIG. 7C is a lateral view of the light guide unit shown in FIG. 7A.

In reference to FIGS. 7B and 7C, the following explains a specific configuration of the light guide unit 11b. FIG. 7B is a cross-sectional view along the line A-A' of the light guide unit 11b shown in FIG. 7A. FIG. 7C is a lateral view of the light guide unit 11b shown in FIG. 7A.

As shown in these drawings, in the area (shown in FIG. 7B) which becomes the light path included in the light-guiding section 47c, a backside of the light guide 47 is not in contact with the substrate 44, while in the area (shown in FIG. 7C) which does not become the light path included in the light-guiding section 47c, a backside 47d of the light guide 47 is in contact with the substrate 44.

Because the light guide 47 is shaped as described above, it is possible to make the light-emitting surface 47a of the light guide 47 and the contact surface (backside) 47d with the substrate 44 be parallel to each other, and it is possible to make the area which becomes the light path included in the light-guiding section 47c be oblique with regard to the light-emitting surface 47a.

Further, in the light guide unit 11b shown in FIG. 6, the light guide is fixated to the substrate by using a method in which a hole is formed on the light guide and a screw is passed through the hole, for example. However, other methods (for example, a method in which a pin is formed on a backside of the light guide, and the pin is inserted into a hole on the substrate) may be used to fixate the light guide to the substrate.

The above preferred embodiments were described by using, as an example, a configuration in which a light-emitting diode (LED) is preferably used as a light source 5. However, the present invention is not limited to such a configuration, and any spot-shaped light source may be used.

Further, the above preferred embodiments were described by using, as an example, a configuration in which protruding sections 12 are preferably provided on each of the two sides of a light source 5. However, the present invention is not limited to such a configuration, and other configurations, such as a configuration in which one protruding section 12 is provided per light guide or a configuration in which three or more protruding sections 12 are provided per light guide, may be used. In either case, it is preferable, in order to fixate more securely the light guide on the substrate, to form one protruding section 12 on the two sides with respect to the light-guiding source 5.

Further, the above preferred embodiments are described by using, as an example, a configuration in which a tandem-type backlight having a plurality of light guide units is preferably provided, for example. However, the present invention is not limited to such a configuration. In other words, a backlight having only one combination of a light source and of a light guide is also included within the scope of the present invention.

The illumination device in accordance with preferred embodiments of the present invention has excellent luminance homogeneity even in a case where the illumination device includes a plurality of light guide units, thereby having a larger light-emitting surface. Therefore, the illumination device in accordance with preferred embodiments of the present invention is preferably used as backlight for a liquid crystal display device having an especially large-sized screen, for example. However, the illumination device in accordance with the present invention is not limited to the above configuration, and it can be used as backlight for any liquid crystal display device.

As described above, the illumination device in accordance with preferred embodiments of the present invention has a configuration including a spot-shaped light source, a light guide arranged to diffuse and surface-emit light from the light source, and a substrate to fixedly dispose the light source and the light guide thereon, the light guide being fixedly disposed on the substrate by connecting, with the substrate, an area on the light guide where the light inputted from the light source is not diffused.

With the above configuration, it is possible to achieve an illumination device having an enhanced light use efficiency and an enhanced luminance homogeneity.

Further, as described above, the liquid crystal display device in accordance with a preferred embodiment of the present invention is configured so as to be provided with the illumination device in accordance with another preferred embodiment of the present invention as backlight.

With the above configuration, because it is possible to irradiate a more homogeneous light to a liquid crystal display panel, it is possible to obtain an increase in the quality level of the display. Further, because an illumination device having a high light use efficiency is used as a backlight, it is possible to achieve a liquid crystal display device having a lower electricity consumption.

The detailed explanations of the present invention which were given above in connection with specific preferred embodiments and examples are merely intended to clarify the technical contents of the present invention. Such specific preferred embodiments and examples should not be interpreted in a restrictive sense only, and various modifications can be exercised within the spirit of the invention and the scope of the following claims.

With preferred embodiments of the present invention, it is possible to achieve an illumination device having an enhanced light use efficiency and an enhanced luminance efficiency. The illumination device in accordance with preferred embodiments of the present invention can be used as backlight of a liquid crystal display device.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An illumination device including:
a spot-shaped light source;
a light guide arranged to diffuse and surface-emit light from the light source; and
a substrate arranged to fixedly dispose the light source and the light guide thereon; wherein
the spot-shaped light source is arranged to face an edge surface of the light guide;
a light flux emitted from the spot-shaped light source: (I) enters the light guide at a critical angle of $\theta$, and (ii) spreads radially inside the light guide at the critical angle of $\theta$, such that a first area and a second area are defined in a light-guiding section of the light guide;
the first area is included in the light flux to spread radially inside the light guide at the critical angle of $\theta$ and the first area is a light path of the light emitted from the spot-shaped light source;
the second area is arranged outside of the light flux and is positioned such that it is not a light path of the light emitted from the spot-shaped light source;
in the first area, a first portion of a back side of the light guide is spaced away from and is not in contact with the substrate;
in the second area, a second portion of the back side of the light guide is in contact with the substrate;
the substrate is connected with the second area of the light-guiding section of the light guide so as to fix the light guide on the substrate;
a light-emitting surface of the light guide is parallel to the second portion of the back side in a direction extending from the spot-shaped light source to the light-emitting surface in a plan view;
the first area is oblique with respect to the light-emitting surface; and
the illumination device further includes a plurality of the spot-shaped light sources and a plurality of the light guides, respective pairs of the plurality of the spot-shaped light sources and the plurality of the light guides are arranged such that light-emitting sections of the plurality of the light guides are arranged on top of light-guiding sections of an adjacent one of the plurality of the light guides.

2. The illumination device according to claim 1, wherein the second area includes a hole, the light guide being fixedly disposed on the substrate by a fixing member arranged to pass through the hole and to be fixed to the substrate.

3. A liquid crystal display device comprising a backlight being an illumination device according to claim 1.

4. The illumination device according to claim 1, wherein a cross sectional shape of the light guide in the direction extending from the spot-shaped light source to the light-emitting surface at a middle portion of the light guide is different from a lateral surface shape of the light guide.

* * * * *